(12) United States Patent
Muramatsu et al.

(10) Patent No.: US 9,874,215 B2
(45) Date of Patent: Jan. 23, 2018

(54) FAN MOTOR CONTROL UNIT

(71) Applicant: Sanyo Denki Co., Ltd., Tokyo (JP)

(72) Inventors: Yo Muramatsu, Tokyo (JP); Takahisa Toda, Tokyo (JP); Kenta Nishimaki, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 863 days.

(21) Appl. No.: 14/301,775

(22) Filed: Jun. 11, 2014

(65) Prior Publication Data

US 2014/0369813 A1   Dec. 18, 2014

(30) Foreign Application Priority Data

Jun. 14, 2013   (JP) ................................ 2013-125704

(51) Int. Cl.
*F04D 27/00* (2006.01)
*H02P 6/15* (2016.01)

(52) U.S. Cl.
CPC ......... *F04D 27/001* (2013.01); *F04D 27/008* (2013.01); *H02P 6/15* (2016.02)

(58) Field of Classification Search
CPC .................................................. F04D 27/001
USPC ................................................. 318/599, 560
See application file for complete search history.

(56) References Cited

U.S. PATENT DOCUMENTS

| | | | | |
|---|---|---|---|---|
| 6,713,979 B2 * | 3/2004 | Naito | ......................... | H02P 6/24 |
| | | | | 318/280 |
| 6,832,898 B2 * | 12/2004 | Yoshida | ................ | F04B 35/045 |
| | | | | 318/119 |
| 8,334,670 B2 * | 12/2012 | Meyer, III | .......... | H02P 29/0241 |
| | | | | 318/801 |
| 8,354,809 B2 * | 1/2013 | Mehlhorn | ............... | F04B 51/00 |
| | | | | 318/400.22 |
| 2013/0076282 A1 | 3/2013 | Wang et al. | | |

FOREIGN PATENT DOCUMENTS

| | | |
|---|---|---|
| JP | 2005312217 A | 11/2005 |
| JP | 2006180608 A | 7/2006 |
| JP | 2008099511 A | 4/2008 |

OTHER PUBLICATIONS

Search Report for European Patent Application No. 14171761.1 dated Aug. 13, 2015.

* cited by examiner

*Primary Examiner* — David S Luo
(74) *Attorney, Agent, or Firm* — Drinker Biddle & Reath LLP

(57) ABSTRACT

A fan motor control unit includes sensor units that each detect a rotational position of the fan motor, a switching unit that selectively connects each of stator coils of the fan motor to a rectifier circuit, a current sensor that detects a current flowing in the fan motor, and a switching control unit that advances, in the case where the current detected by the current sensor exceeds a threshold, a energization timing from the rectifier circuit to the stator coils with respect to the energization timing applied while the current detected by the current sensor is lower than the threshold, on the basis of the rotational position detected by the sensor units.

9 Claims, 10 Drawing Sheets

Signal outputted by sensor unit

Timing to output switching pulse to driver circuit

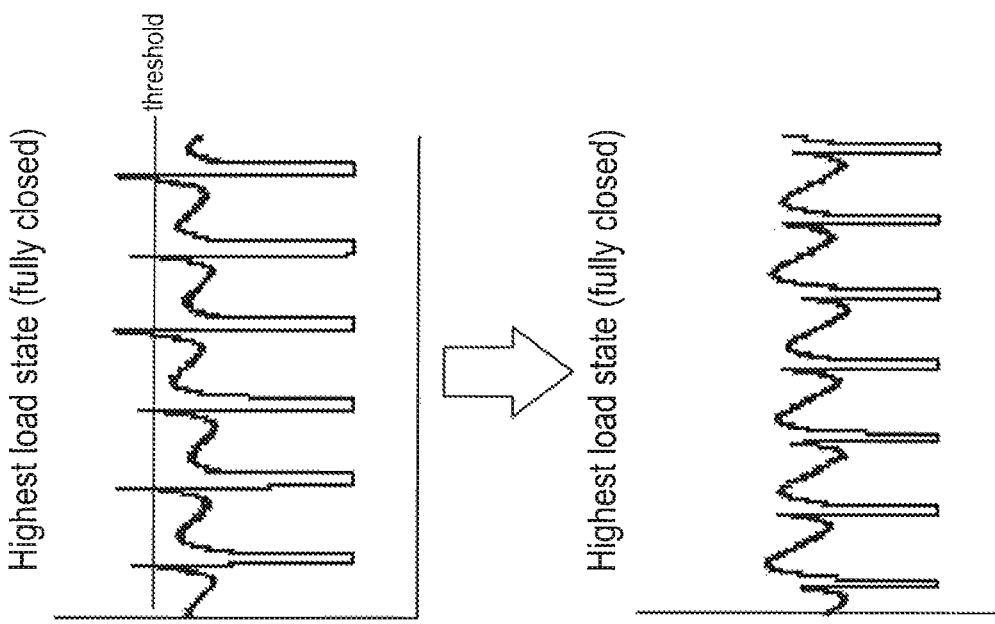
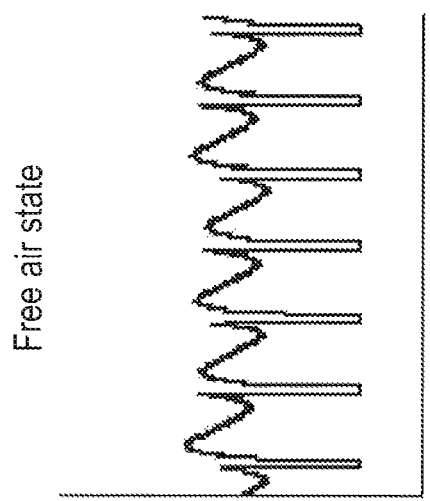

Free air state
before improvement

Highest load state
before improvement

Highest load state (fully closed) after improvement

FAN MOTOR CONTROL UNIT

RELATED APPLICATIONS

This application claims priority to Japanese Application No, 2013-125704, filed Jun. 14, 2013.

BACKGROUND

1. Technical Field

The present invention relates to a fan motor control unit that suppresses degradation in air volume characteristic and an increase in power loss, despite an increase in load imposed on the fan motor.

2. Description of Related Art

Brushless motors have thus far been employed for use as fan motor, because the rotation speed can be controlled over a wide range. The brushless motor includes, for example as disclosed in Japanese Unexamined Patent Application Publication No. 2006-180608, a plurality of Hall elements to detect the rotational position of the rotor according to signals outputted by the Hall elements.

Energization timing for the stator coil in the brushless motor is set in advance with respect to each of the rotational positions of the rotor. Here, the energization timing refers to the timing at which the stator coil is connected to the power source.

In existing fan motor control units, however, the energization timing for the stator coil is constant. Accordingly, as shown in FIG. 10, the rotation speed (broken lines) of the fan motor drops, the air volume decreases, and the static pressure of the fan increases, as the load on the fan motor becomes higher (solid lines). In other words, the air volume characteristic is degraded as the load on the fan motor is increased.

To be more detailed referring to FIG. 10, the rotation speed of the fan motor is highest in a free-air state in which the load on the fan motor is lightest, and the rotation speed of the fan motor becomes lower as indicated by the broken lines toward a high-load state through a low-load state, until the rotation speed becomes lowest at a highest-load state in which the fan motor is subjected to a heaviest load. Therefore, as indicated by solid lines in FIG. 10, the air volume decreases and the static pressure of the fan increases, with the increase of the load imposed on the fan motor. Here, the highest-load state refers to a fully closed state in which the air inlet is fully closed when the fan is mounted in the casing.

Further, as shown in FIGS. 11A to 11D, the waveform of the current flowing through the stator coil becomes more irregular as the fan motor shifts toward the higher load state, until the fluctuation range of the current expands to the extent that needle-shaped waveforms appear each time the stator coil is switched. Thus, the circuit suffers greater power loss, with the increase of the load imposed on the fan motor.

With reference to four graphs shown in FIGS. 11A to 11D, the current fluctuation at the time of the switching of the stator coil (the point where the current sharply drops) is not prominent in the free-air state (FIG. 11A). However, as the fan motor shifts from the low-load state (FIG. 11B) to the high-load state (FIG. 11C), and further to the highest-load state (FIG. 11D), the current fluctuation range expands until the current waveform sharply rising in needle shape appears. It is apparent from FIGS. 11A to 11D that the height of the current waveform sharply rising in a needle shape becomes higher in the order of the low-load state, the high-load state, and the highest-load state.

As described above, with the existing fan motor control unit, the rotation speed of the fan motor drops and the air volume characteristic is degraded with the increase of the load imposed on the fan. In addition the circuit suffers greater power loss owing to the expansion of the current fluctuation range.

SUMMARY

The present invention has been accomplished in view of the foregoing situation, and provides a fan motor control unit that suppresses degradation in air volume characteristic and an increase in power loss, despite an increase of a load imposed on the fan motor.

In an aspect, the present invention provides a fan motor control unit including a rotational position detection sensor, a switching unit, a current sensor and a switching control unit.

The rotational position detection sensor detects a rotational position of the fan motor. The switching unit selectively connects each of coils of the fan motor to a power source. The current sensor detects a current flowing in the fan motor. The switching control unit advances, in the case where the current detected by the current sensor exceeds a threshold, a energization timing from the power source to the coil with respect to the energization timing applied while the current detected by the current sensor is lower than the threshold, on the basis of the rotational position detected by the rotational position detection sensor.

With the fan motor control unit thus configured, the energization timing from the power source to the coil is advanced with respect to the energization timing applied while the current detected by the current sensor is lower than the threshold, in the case where the current detected by the current sensor exceeds the threshold. Therefore, degradation in air volume characteristic and an increase in power loss can be suppressed, despite an increase of the load imposed on the fan motor.

BRIEF DESCRIPTION OF THE DRAWINGS

FIG. 6A shows the waveform of the current that flows in the fan motor M in the free-air state.

FIG. 6B shows the waveform of the current that flows in the fan motor M in the highest-load state (fully closed).

DETAILED DESCRIPTION

Hereafter, an embodiment of a fan motor control unit according to the present invention will be described.

Configuration of Fan Motor Control Unit

Figure 1:
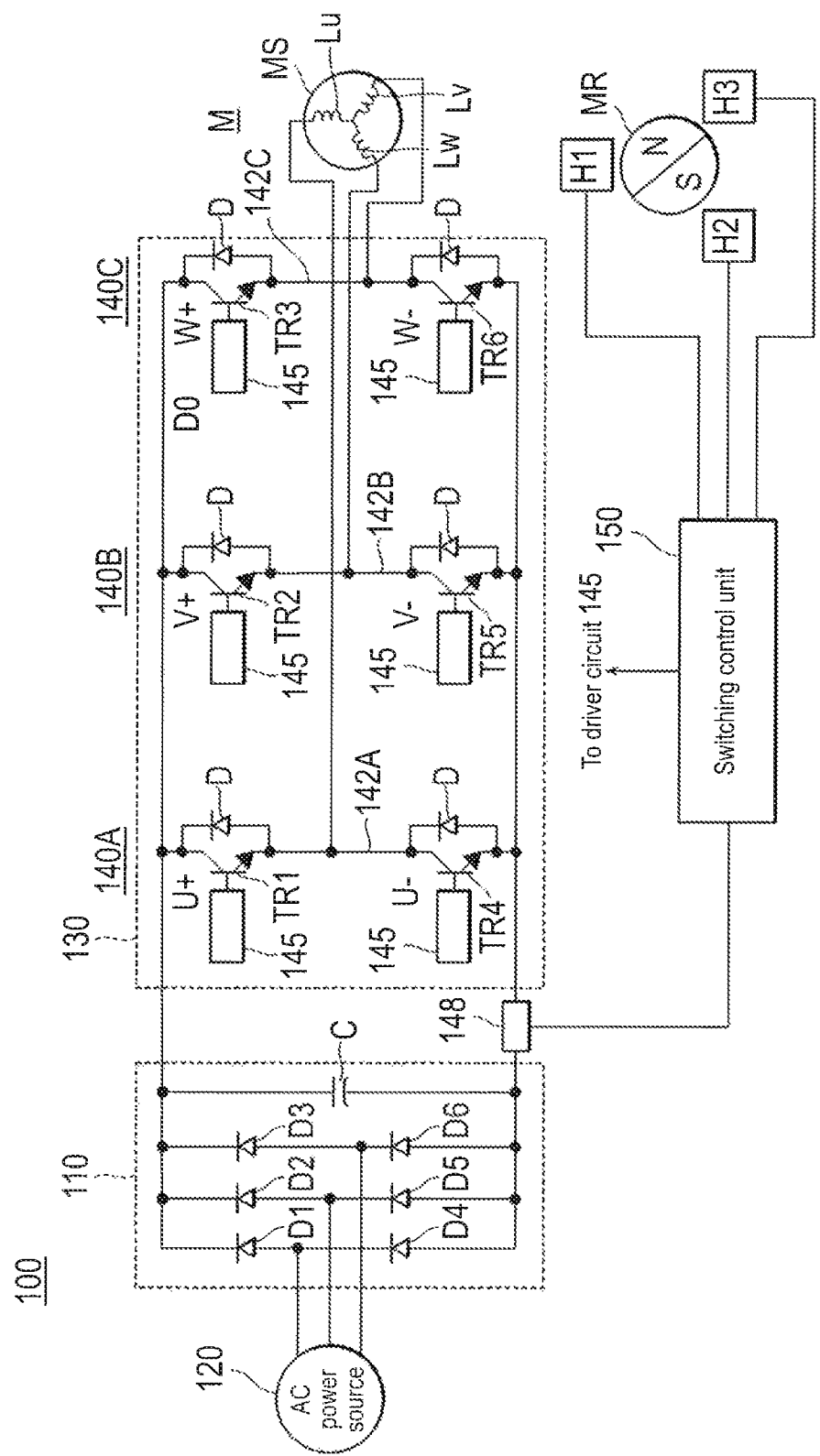
FIG. 1 is a schematic diagram showing a configuration of a fan motor control unit according to an embodiment of the present invention.

FIG. 1 is a schematic diagram showing a configuration of the fan motor control unit according to the embodiment.

The fan motor control unit 100 includes a rectifier circuit 110 having a smoothing capacitor C, and an inverter circuit 130 connected to the fan motor M.

The rectifier circuit 110 includes, as shown in FIG. 1, six diodes D1 to D6 bridge-connected to each other, and the six diodes D1 to D6 each perform full-wave rectification of the current from an AC power source (three-phase) 120. The current fully rectified by the six diodes D1 to D6 is smoothed by the smoothing capacitor C, so that the ripple of the DC obtained through the full-wave rectification is suppressed. The rectifier circuit 110 serves as the power source for the fan motor M.

An inverter circuit 130 that serves as the switching unit is connected in parallel to the rectifier circuit 110. A current sensor 148 is connected between the rectifier circuit 110 and the inverter circuit 130. The current sensor 148 detects the current flowing in the fan motor M, in particular a peak current. The inverter circuit 130 selectively connects each of stator coils, to be subsequently described, of the fan motor M to the rectifier circuit 110. The inverter circuit 130 includes three arm circuits 140A, 140B, and 140C that switch the DC rectified by the rectifier circuit 110.

The arm circuit 140A connects a pair of transistors TR1 and TR4 to each other in series, and connects a stator coil Lu of the fan motor M to a connection line 142A between the pair of transistors TR1 and TR4. The arm circuit 140B connects a pair of transistors TR2 and TR5 to each other in series, and connects a stator coil Lw of the fan motor M to a connection line 142B between the pair of transistors TR2 and TR5. Likewise, the arm circuit 140C connects a pair of transistors TR3 and TR6 to each other in series, and connects a stator coil Lv of the fan motor M to a connection line 142C between the pair of transistors TR3 and TR6. As shown in FIG. 1, the stator coils Lu, Lv, and Lw are star-connected.

The three arm circuits 140A, 140B, and 140C are connected in parallel to the smoothing capacitor C of the rectifier circuit 110. A diode D is connected in reverse polarity between the collector and the emitter of each of the transistors TR1, TR4, TR2, TR5, TR3, and TR6. A driver circuit 145 for switching a corresponding one of the transistors TR1, TR4, TR2, TR5, TR3, and TR6 is connected to the gate of each of the transistors. A switching control unit 150 to be subsequently described is connected to the driver circuits 145. The driver circuits 145 each turn on the corresponding transistor upon receipt of a switching pulse outputted by the switching control unit 150.

The fan motor M according to this embodiment is a brushless motor. A stator MS of the fan motor M includes the three stator coils Lu, Lv, and Lw star-connected to each other. A rotor MR of the fan motor M includes a cylindrical magnet magnetized to N-pole and S-pole in one of two divided portions, so as to rotate driven by magnetic fields generated by the stator coils Lu, Lv, and Lw.

Figure 4:
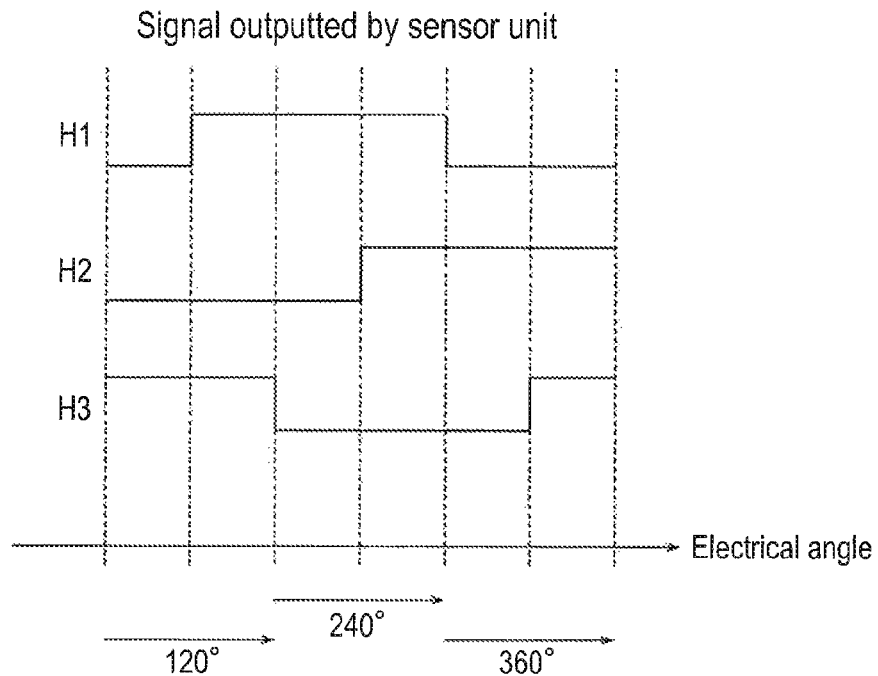
FIG. 4 is a graph for explaining the signal outputted by the sensor unit shown in FIGS. 1 and 2.

Three sensor units H1, H2, and H3 are disposed around the rotor MR, along the rotating direction thereof. The three sensor units H1, H2, and H3 are disposed with a phase difference of 120 degrees between each other. The sensor units H1, H2, and H3 each output, for example as shown in FIG. 1 and FIG. 4, a HIGH signal when opposed to the N-pole of the rotor MR, and output a LOW signal when opposed to the S-pole opposite to the N-pole. The HIGH signal and the LOW signal are switched between each other at the boundary between the N-pole and the S-pole. The sensor units H1, H2, and H3 each output a signal having a pulse width proportional to the rotation speed of the rotor MR. The sensor units H1, H2, and H3 serve as the rotational position detection sensor that detects the rotational position of the rotor MR.

In this embodiment, the sensor units H1, H2, and H3 are constituted of Hall elements. However, other types of sensors than the Hall element may be employed, provided that the sensor is capable of detecting the rotational position of the rotor MR. The stator coils Lu, Lv, and Lw may be utilized as the rotational position detection sensor in place of the sensor units.

The fan motor control unit 100 includes the switching control unit 150 to which the sensor units H1, H2, and H3 are connected. The switching control unit 150 is configured to advance, in the case where the peak current detected by the current sensor 148 exceeds a predetermined threshold, a energization timing from the rectifier circuit 110 to the stator coils Lu, Lv, and Lw with respect to the energization timing applied while the peak current is lower than the threshold, on the basis of the rotational position detected by the rotational position detection sensor.

The switching control unit 150 outputs the switching pulse to each of the driver circuits 145. The switching control unit 150 advances the timing to output the switching pulse with the increase of the load imposed on the fan motor M. Whether the load has increased is decided depending on whether the peak current detected by the current sensor 148 has exceeded the predetermined threshold.

Figure 2:
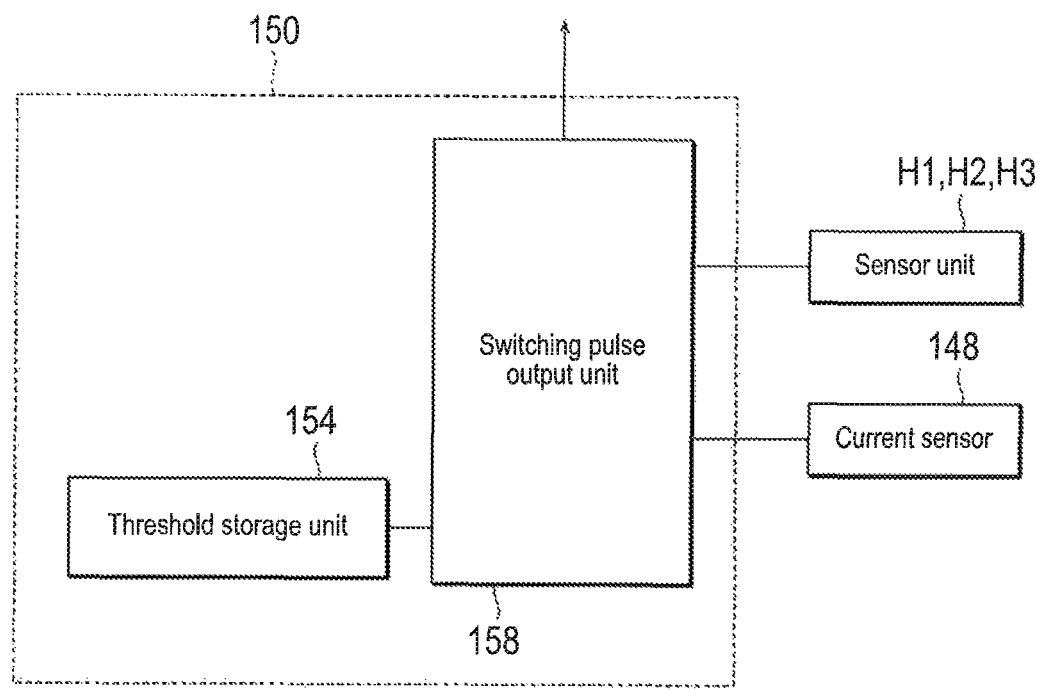
FIG. 2 is a block diagram showing a configuration of the switching control unit shown in FIG. 1.

FIG. 2 is a block diagram showing a configuration of the switching control unit 150 shown in FIG. 1. The switching control unit 150 includes a threshold storage unit 154 and a switching pulse output unit 158.

The threshold storage unit 154 stores therein a plurality of thresholds of different levels. The thresholds are compared with the peak current detected by the current sensor 148. The thresholds of different levels may be set either in stages or continuously, i.e., steplessly.

The threshold storage unit 154 also stores therein a plurality of energization timings respectively corresponding to the thresholds. In the case where the plurality of thresholds are stored in the threshold storage unit 154, the energization timings are set to be earlier the higher the corresponding threshold is. Here, the energization timing refers to the period of time before the switching pulse output unit 158 outputs the switching pulse as will be described hereunder, after the sensor units H1, H2, and H3 have detected the rotational position of the rotor MR. In other words, the energization timing is the timing at which the stator coils Lu, Lv, and Lw are connected to the rectifier circuit 110.

The switching pulse output unit 158 connects the three sensor units H1, H2, and H3 to the current sensor 148. The three sensor units H1, H2, and H3 each output, as shown in FIG. 4, HIGH and LOW signals with a phase shift of an electrical angle of 120 degrees, depending on the rotational position of the rotor MR. Therefore, the switching pulse output unit 158 can recognize the rotational position of the rotor MR on the basis of the HIGH and LOW signals outputted by each of the three sensor units H1, H2, and H3. The current sensor 148 detects a peak value of the current flowing through the three stator coils Lu, Lv, and Lw of the fan motor M.

The switching pulse output unit 158 constantly compares between the peak current detected by the current sensor 148 and the thresholds stored in the threshold storage unit 154. The switching pulse output unit 158 also receives the signals outputted by the sensor units H1, H2, and H3 to thereby recognize the rotational position of the rotor MR, and outputs the switching pulse to each of the driver circuits 145 (see FIG. 1).

Figure 5:
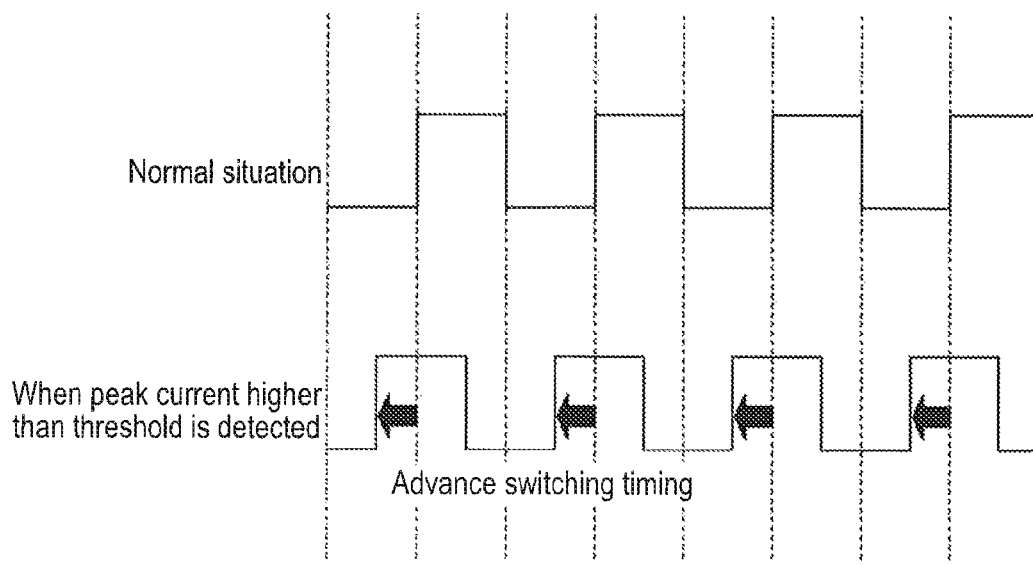
FIG. 5 is a graph for explaining energization timing between the coil and the power source.

The switching pulse output unit 158 outputs the switching pulse to the driver circuits 145 with a predetermined delay after the signals outputted by the sensor H1, H2, and H3 are inputted, while the peak current detected by the current sensor 148 is lower than the threshold. In contrast, in the case where the peak current detected by the current sensor 148 exceeds the threshold, the switching pulse output unit 158 outputs the switching pulse to the driver circuits 145 with an advance of a predetermined length of time. Therefore, as shown in FIG. 5, the switching pulse is outputted earlier when the peak current detected by the current sensor 148 exceeds the threshold, than while the peak current is lower than the threshold.

Operation of Fan Motor Control Unit

Figure 3:
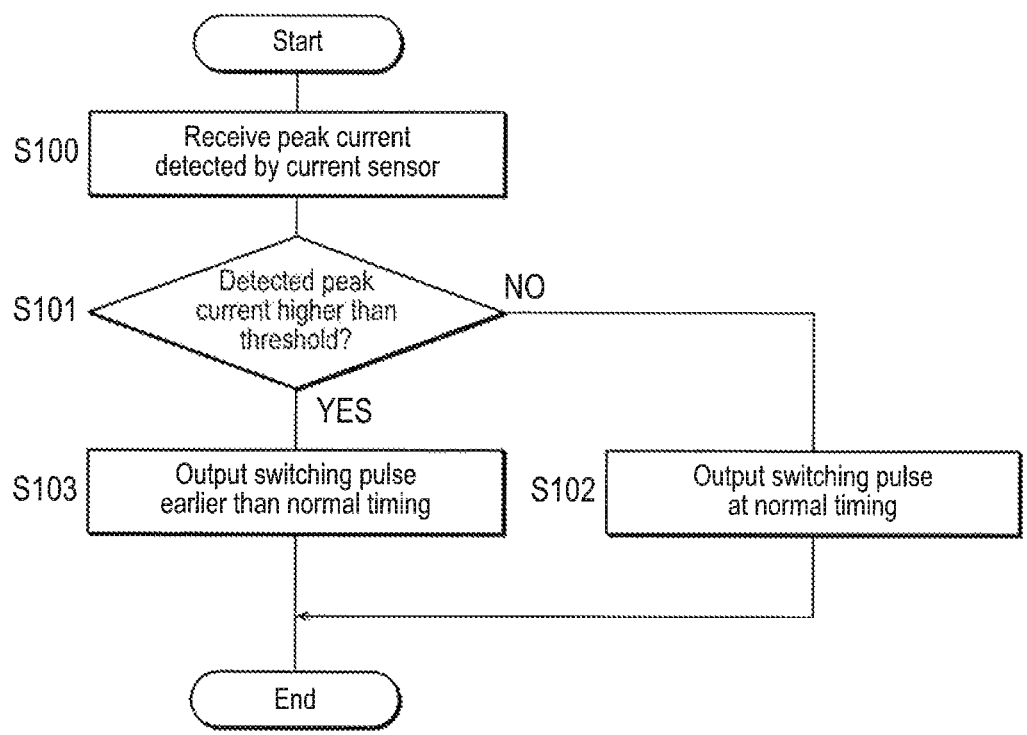
FIG. 3 is a flowchart showing the operation performed by the fan motor control unit according to the embodiment.

An operation of the fan motor control unit 100 shown in FIG. 1 will be described hereunder. FIG. 3 is a flowchart showing the operation of the fan motor control unit 100.

The peak current detected by the current sensor 148 is inputted to the switching pulse output unit 158 (step S100) The current sensor 148 detects the peak value of the current flowing in the three stator coils Lu, Lv, and Lw of the fan motor M, supplied from the rectifier circuit 110 through the inverter circuit 130. The peak current appears at the time of phase shift when route of the current supplied to the stator coils Lu, Lv, and Lw is switched.

The switching pulse output unit 158 compares between the peak current detected by the current sensor 148 and the threshold stored in the threshold storage unit 154 (step S101).

In the case where the peak current detected by the current sensor 148 is lower than the threshold (NO at step S101), the switching pulse output unit 158 outputs the switching pulse at the normal timing based on the signals outputted by the sensor units H1, H2, and H3, as shown in FIG. 5 (step S102).

In contrast, in the case where the peak current detected by the current sensor 148 is higher than the threshold (YES at step S101), switching pulse output unit 158 outputs the switching pulse at an earlier timing than the normal timing based on the signals outputted by the sensor units H1, H2, and H3, as shown in FIG. 5 (step S103).

To be more detailed, the switching pulse output unit 158 is configured to supply the power in six patterns. In a energization pattern 1 for example, the transistors TR1 and TR5 shown in FIG. 1 are switched by the driver circuit 145, so that the current flows through a closed circuit formed along the rectifier circuit 110, the transistor TR1, the stator coil Lu, the stator coil Lw, the transistor TR5, and back again to the rectifier circuit 110. In a energization pattern 2, the transistors TR1 and TR6 shown in FIG. 1 are switched by the driver circuit 145, so that the current flows through a closed circuit formed along the rectifier circuit 110, the transistor TR1, the stator coil Lu, the stator coil Lv, the transistor TR6, and back to the rectifier circuit 110. In a energization pattern 3, the transistors TR2 and TR6 are switched by the driver circuit 145, so that the current flows through a closed circuit formed along the rectifier circuit 110, the transistor TR2, the stator coil Lw, the stator coil Lv, the transistor TR6, and back to the rectifier circuit 110. In the energization patterns 4 to 6, the current flows through a closed circuit formed in the same concept as the energization patterns 1 to 3.

The switching pulse output unit 158 receives the signals outputted by the sensor units H1, H2, and H3 and recognizes the rotational position of the rotor MR on the basis of the combination of HIGH and LOW of the three signals, and then selects in which of the energization pattern the current is to be supplied to the stator coils Lu, Lv, and Lw. In the case where the peak current detected by the current sensor 148 is lower than the threshold when the energization pattern 1 is selected by the switching pulse output unit 158, the switching pulse output unit 158 outputs the switching pulse to the driver circuit 145 at the normal timing as shown in FIG. 5, thereby turning on the transistor TR1 and the transistor TR5. In contrast, in the case where the peak current detected by the current sensor 148 is higher than the threshold when the energization pattern 1 is selected by the switching pulse output unit 158, the switching pulse output unit 158 outputs the switching pulse to the driver circuit 145 at a timing earlier than the normal timing as shown in FIG. 5, thereby turning on the transistor TR1 and the transistor TR5.

When the peak current detected by the current sensor 148 is higher than the threshold, the fan motor M is subjected to a heavier load. In this case, a decrease in number of rotations of the fan motor M can be prevented by outputting the switching pulse to the driver circuit 145 at a timing earlier than the normal timing. Thus, degradation in air volume characteristic arising from an increase of the load imposed on the fan motor can be suppressed.

In the case where the plurality of thresholds are stored in the threshold storage unit 154, lengths of time by which the energization timing is to be advanced are preset for the respective thresholds. In this case, the timing that the switching pulse output unit 158 outputs the switching pulse is advanced in stages, as the peak current detected by the current sensor 148 increases. Therefore, as the load on the fan motor increases, the decrease in number of rotations of the fan motor M is suppressed in stages.

In the case where the stepless (continuous) threshold is stored in the threshold storage unit 154, the length of time by which the energization timing is to be advanced is also preset steplessly. In this case, the timing that the switching pulse output unit 158 outputs the switching pulse is steplessly advanced, as the peak current detected by the current sensor 148 increases. Therefore, as the load on the fan motor increases, the decrease in number of rotations of the fan motor M steplessly suppressed.

FIGS. 6A and 6B include graphs for explaining the operation of the fan motor control unit 100 according to this embodiment. The graph in FIG. 6A shows the waveform of the current that flows in the fan motor M in the free-air state, and the graphs in FIG. 6B shows the waveform of the current that flows in the fan motor M in the highest-load state (fully closed).

In the free-air state in which the fan motor M is substantially free from a load, as shown in FIG. 6A, the peak value represented by the needle-shaped waveform that appears at the time of the switching of the stator coils Lu, Lv, and Lw is lower than the threshold. Accordingly, the switching pulse is outputted at the normal timing shown in FIG. 5, and the energization pattern is switched.

In the highest-load state (air inlet is fully closed) in which the fan motor M is subjected to a highest load the peak value represented by the needle-shaped waveform that appears at the time of the switching of the stator coils Lu, Lv, and Lw exceeds the threshold as shown in the graph on the upper FIG. 6B. Accordingly, the switching pulse is outputted at a timing earlier than the normal taming shown in FIG. 5, and the energization pattern is switched. As a result, although the average of the current flowing in the fan motor M is increased the peak value represented by the needle-shaped waveform becomes lower as shown in the graph on the lower in FIG. 6B.

The current waveform is associated with the rotation speed and the electromotive force of the fan motor M, and varies depending on the magnitude of the load imposed on the fan. As is apparent from FIGS. 6A and 6B, prominent fluctuations of the current waveform appear at the time of the switching of the stator coils Lu, Lv, and Lw. Therefore, the fan motor control unit 100 according to this embodiment includes the current sensor 148, and is configured to advance the switching timing for the fan motor M, once the peak value of the current flowing in the fan motor M exceeds the threshold. Such an arrangement suppresses degradation in rotation speed originating from the increase of the load imposed on the fan motor M.

Figure 7A:
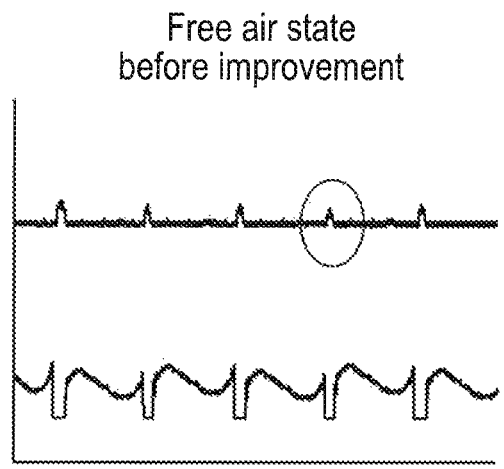
FIG. 7A includes graph for explaining the operation of the fan motor control unit according to the embodiment.
Figure 7B:
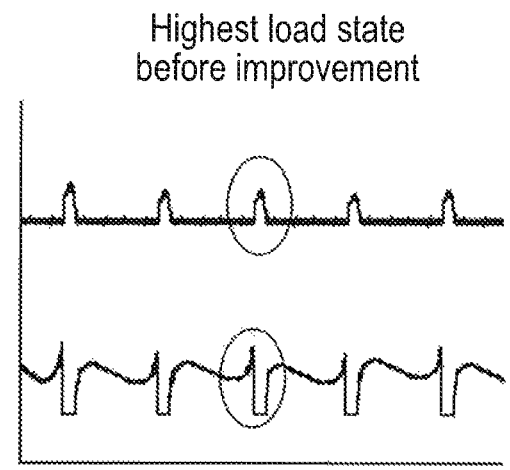
FIG. 7B includes graph for explaining the operation of the fan motor control unit according to the embodiment.
Figure 7C:
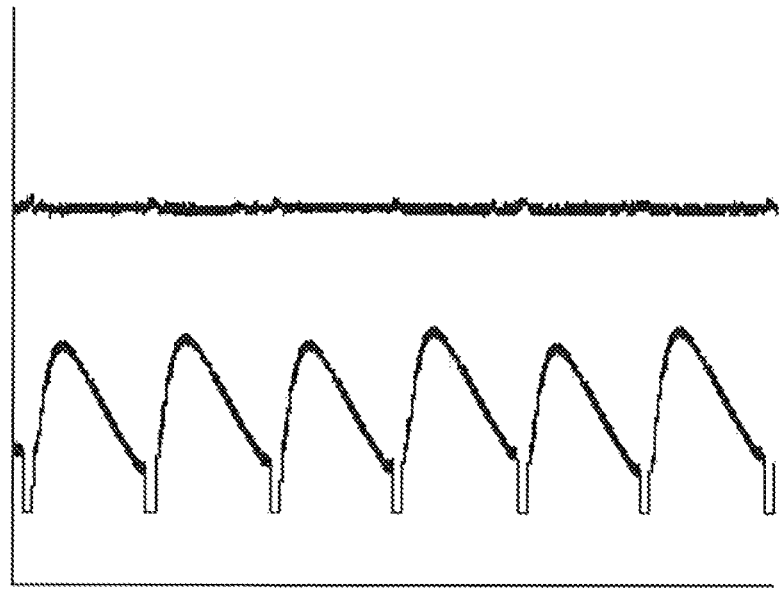
FIG. 7C includes graph for explaining the operation of the fan motor control unit according to the embodiment.

FIGS. 7A to 7C include graphs for explaining the operation of the fan motor control unit according to this embodiment. In the graph in FIG. 7A, the lower waveform represents the current flowing in the fan motor M in the free-air state, and the upper waveform represents the voltage between the rectifier circuit 110 and the ground. In the graph in FIG. 7B, the lower waveform represents the current flowing in the fan motor in the highest-load state (fully closed), and the upper waveform represents the voltage between the rectifier circuit 110 and the ground.

As shown in those graphs, peak voltages appear between the rectifier circuit 110 and the ground at regular intervals even in the free-air state, and the peak voltage becomes highest in the highest-load state. Such peak voltages appear as a result of the switching of stator coils Lu, Lv, and Lw, because the sharp fluctuation of the current waveform causes the stator coils Lu, Lv, and Lw to generate a large counter electromotive force.

The energy originating from the counter electromotive force generates a regenerative current, thereby increasing the voltage between the rectifier circuit 110 and the ground. To suppress such an increase in voltage, generally a capacitor or a Zener diode is connected between the rectifier circuit 110 and the ground. However, in the case of employing a fan motor M having a large capacity, the capacitor or the Zener diode for protection from the voltage increase also has to be larger in capacity, or the number of the capacitors or diodes has to be increased. Therefore, it becomes difficult to secure a sufficient mounting space, and an increase in cost is incurred.

With the fan motor control unit 100 according to this embodiment, the peak current that appears at the time of the switching of the stator coils Lu, Lv, and Lw can be suppressed as shown in FIG. 7C, which represents the current waveform (lower one) and the waveform of the voltage between the rectifier circuit 110 and the ground (upper one). Therefore, the generation of the regenerative current is minimized and hence the voltage between the rectifier circuit 110 and the ground barely increases. Consequently, small-sized capacitors or Zener diodes can be employed in a fewer number, for protection from voltage increase, and thus the difficulty in securing the mounting space, as well as the increase in cost can be minimized.

As described above, the fan motor control unit 100 according to this embodiment is capable of minimizing the voltage fluctuation between the rectifier circuit 110 and the ground, and hence suppressing the increase in power loss in the circuit.

Advantageous Effects of the Fan Motor Control Unit

With a conventional fan motor control unit, which is not designed to perform the control as does the fan motor control unit 100 according to this embodiment, the air volume characteristic of the fan largely fluctuates depending on the shape of the vane and the torque characteristic of the fan motor. Accordingly, the rotation speed of the fan motor drops as the fan shifts to the high-load state, and the air volume characteristic is degraded. It is because the load on the fan motor depends on the fluctuation of the load on the vanes of the fan, that the rotation speed and the air volume characteristic of the fan motor are degraded. For such a reason, the increase of the load imposed on the fan motor leads to the decrease in rotation speed and increase in current.

Thus, in view of the significance of the correlation between the rotation speed of the fan motor and the current fluctuation, the fan motor control unit 100 according to this embodiment includes the current sensor and is configured to advance the switching timing for the fan motor, once the current flowing in the fan motor exceeds the predetermined threshold. Appropriately changing the switching timing for the fan motor according to the load fluctuation allows the rotation speed of the fan motor to be adjusted as desired within a certain range.

Figure 8:
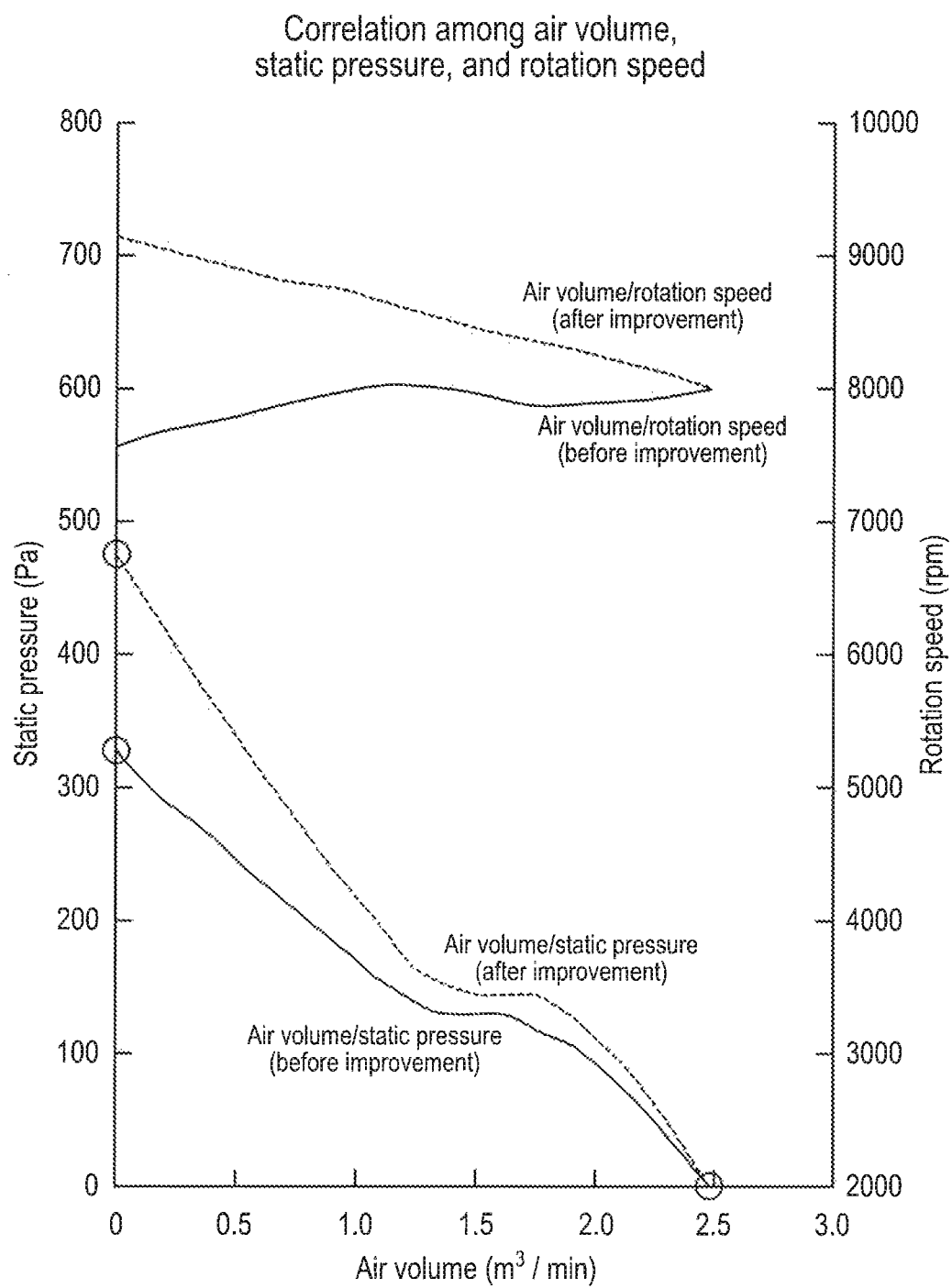
FIG. 8 is a graph showing measurement results of characteristics of a conventional fan motor control unit and those of the control unit of the fan motor according to the embodiment.

FIG. 8 is a graph showing measurement results of characteristics of a conventional fan motor control unit and those of the control unit of the fan motor according to this embodiment.

As shown in FIG. 8, with the air volume/rotation speed characteristic (before improvement) of the conventional control unit, the rotation speed of the fan motor drops with the increase of the load imposed on the fan motor. With the air volume/static pressure characteristic (before improvement) of the conventional control unit, the air volume decreases and the static pressure increases, with the increase of the load on the fan motor.

In contrast, with the air volume/rotation speed characteristic (after improvement) of the control unit according to this embodiment, the rotation speed does not drop but rather increases unlike with the conventional control unit, despite the increase of the load imposed on the fan motor, as shown in FIG. 8. With the air volume/static pressure characteristic (after improvement) of the control unit according to this embodiment, although the air volume decreases the static pressure significantly increases, with the increase of the load imposed on the fan motor.

Thus, the fan motor control unit 100 according to this embodiment is capable of suppressing the degradation in air volume characteristic despite the increase of the load imposed on the fan motor.

Figure 9:
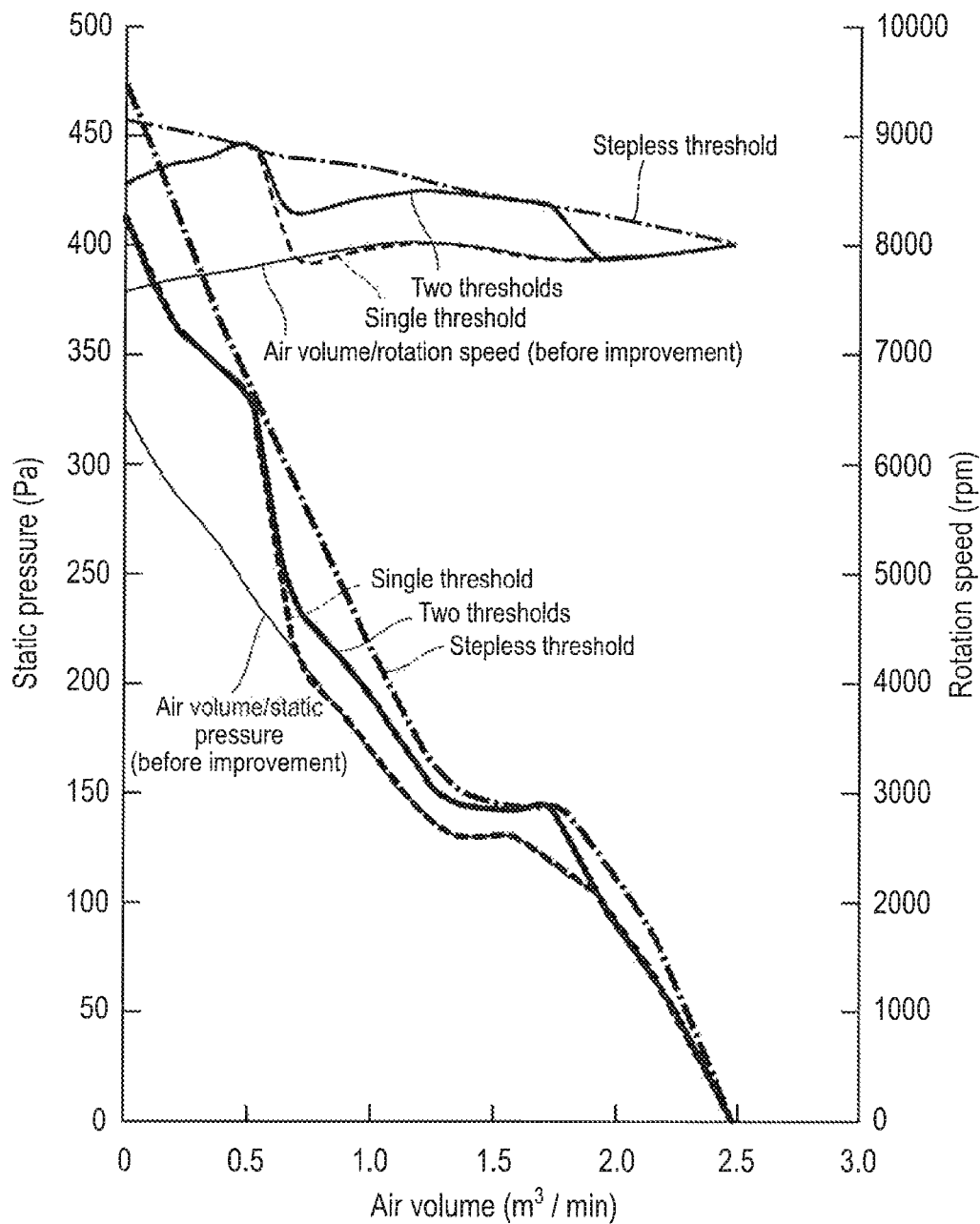
FIG. 9 is a graph showing fluctuation of characteristics of the fan motor control unit according to the embodiment, arising from different threshold settings.
Figure 10:
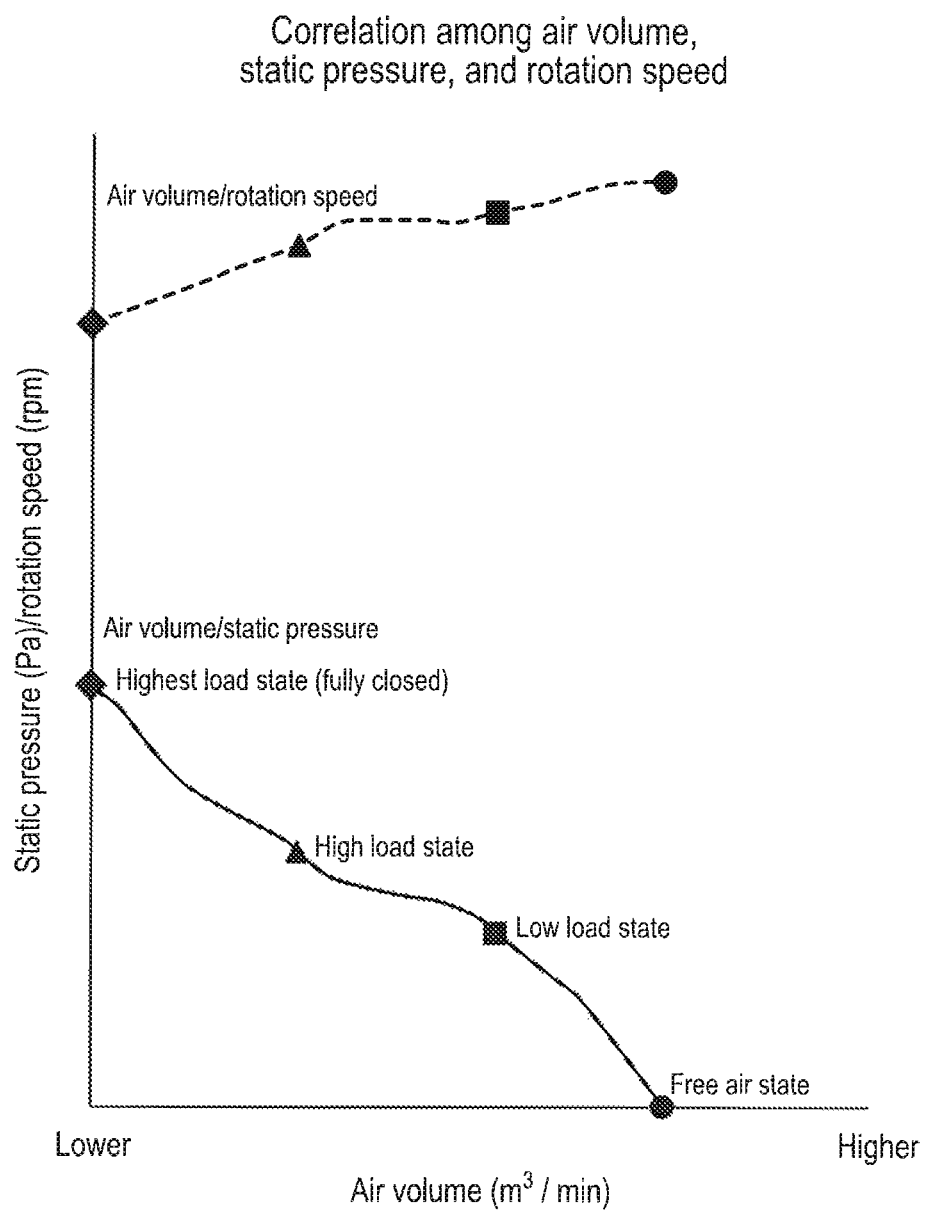
FIG. 10 is a graph showing the characteristic of the conventional fan motor control unit.
Figure 11B:
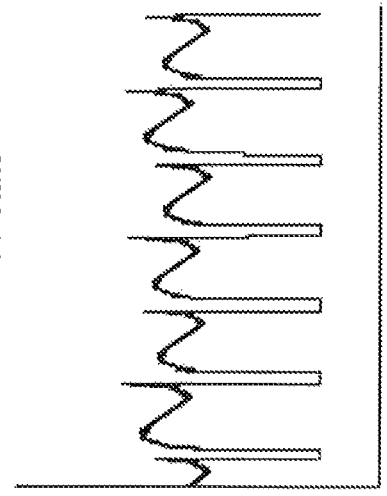
FIG. 11B includes graphs showing the characteristic of the conventional tan motor control unit.
Figure 11D:
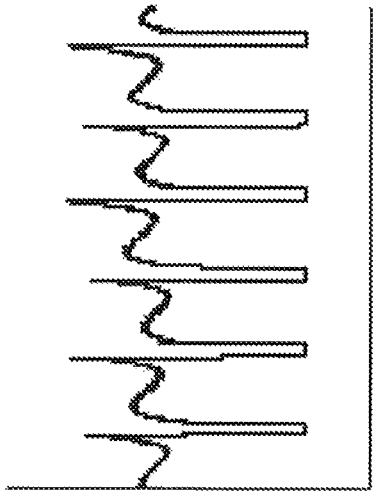
FIG. 11D includes graphs showing the characteristic of the conventional fan motor control unit.
Figure 11A:
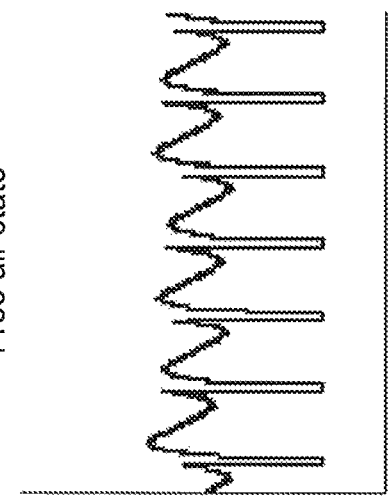
FIG. 11A includes graphs showing the characteristic of the conventional fan motor control unit.
Figure 11C:
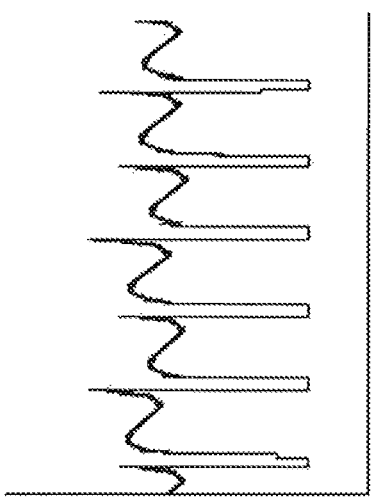
FIG. 11C includes graphs showing the characteristic of the conventional fan motor control unit.

FIG. 9 is a graph showing fluctuation of characteristics of the fan motor control unit according to this embodiment, arising from different threshold settings.

As shown in FIG. 9, with the conventional control unit in which no threshold is set, the air volume/rotation speed characteristic and the air volume/static pressure characteristic (before improvement) are identical to those shown in FIG. 8. In other words, the rotation speed of the fan motor drops with the increase of the load imposed on the fan motor, and the air volume decreases and the static pressure increases, with the increase of the load on the fan motor.

In the case where just one threshold is set in the fan motor control unit 100 according to this embodiment, for example in the vicinity of the air volume of 0.5 m$^3$/min, the switching timing for the fan motor is advanced when the load on the fan motor increases to the extent that the air volume is decreased to the vicinity of 0.5 m$^3$/min. Therefore, as shown in FIG. 9, the static pressure increases further as the air volume is decreased further from the vicinity of 0.5 m$^3$/min. In addition, the rotation speed of the fan motor increases after the air volume is decreased to the vicinity of 0.5 m$^3$/min.

In the case where a threshold is added, for example in the vicinity of the air volume of 1.8 m$^3$/min, so as to set two thresholds in total in the fan motor control unit 100 according to this embodiment, the switching timing for the fan motor is advanced as a first stage, when the load on the fan motor increases to the extent that the air volume decreases to the vicinity of 1.8 m$^3$/min. As a second stage, the switching timing for the fan motor is advanced further with a further increase of the load on the fan motor to the extent that the air volume decreases to the vicinity of 0.5 m$^3$/min. Accordingly, as shown in FIG. 9, the static pressure increases with the decrease of the air volume, after the air volume has dropped to the vicinity of 1.8 m$^3$/min. After the air volume has reached the vicinity of 0.5 m$^3$/min, the static pressure further increases with the decrease of the air volume. In addition, the rotation speed of the fan motor is increased when the air volume decreases to the vicinity of 1.8 m$^3$/min, and again increased when the air volume drops further to the vicinity of 0.5 m$^3$/min.

Further, in the case where the threshold is steplessly set in the fan motor control unit 100 according to this embodiment, the switching timing for the an motor is gradually advanced with an increase of the load on the fan motor. Therefore, as shown in FIG. 9, the static pressure increases at the highest rate of climb with respect to the decrease of the air volume, and the rotation speed of the fan motor is also increased with the decrease of the air volume.

The foregoing characteristics can be obtained because the current flowing in the fan motor is constantly monitored and the switching timing for the fan motor is changed according to the value of the current. By optimizing the correlation between the load imposed on the fan motor and the switching timing for the fan motor, a decrease in rotation speed due to a load imposed on the vanes of the fan can be minimized.

In either of the cases where one threshold is set and where two thresholds are set, it is preferable to select an optimum value taking the characteristic of the fan motor into account. In the case where the threshold is steplessly set also, it is preferable to optimize the correlation between the load imposed on the fan motor and the switching timing for the fan motor, taking the characteristic of the fan motor into account. Whereas rotation speed of the fan motor is set to be increased with the decrease of the air volume in the setting shown in FIG. 9, the extent of the increase of the rotation speed can be controlled, or the rotation speed can be maintained constant, by properly adjusting the correlation between the threshold to be set and the switching timing for the fan motor.

As described thus far, the fan motor control unit 100 according to the foregoing embodiment is configured to advance the energization timing from the power source to the coil when the current detected by the current sensor exceeds the threshold, with respect to the energization timing applied while the current is lower than the threshold, and is therefore capable of suppressing the degradation in air volume characteristic and the increase in power loss, despite the increase of the load imposed on the fan motor.

Further, with the fan motor control unit 100 according to the foregoing embodiment, the air volume/static pressure characteristic and the air volume/rotation speed characteristic can be adjusted to a desired characteristic, by properly adjusting the correlation between the threshold to be set and the switching timing for the fan motor.

Further, although the fan motor is exemplified by the three-phase motor in the foregoing embodiment, the spirit of the present invention broadly encompasses motors having various phases, such as a single-phase motor, a two-phase motor, a five-phase motor, and so forth. Still further, although the rotor possesses two poles in the embodiment, the present invention is also applicable to a motor having three or more poles. In addition, the present invention is applicable to a motor having different numbers of slots.

What is claimed is:
1. A fan motor control unit comprising:
a rotational position detection sensor that detects a rotational position of the fan motor;
a switching unit that selectively connects each of coils of the fan motor to a power source;
a current sensor that detects a current flowing in the fan motor; and
a switching control unit that advances, in the case where the current detected by the current sensor exceeds a threshold, a energization timing from the power source to the coils with respect to the energization timing applied while the current detected by the current sensor is lower than the threshold, on the basis of the rotational position detected by the rotational position detection sensor;
wherein the switching control unit includes a threshold storage unit that stores therein one or more thresholds, and a plurality of thresholds of different levels are stored in the threshold storage unit.

2. The fan motor control unit according to claim 1,
wherein the threshold storage unit stores therein energization timings respectively corresponding to the thresholds.

3. The fan motor control unit according to claim 2,
wherein the energization timings are set to be earlier the higher the corresponding threshold is.

4. The fan motor control unit according to claim 2,
wherein the energization timing is a period of time before the switching unit connects each of the coils to the power source, after the rotational position detection sensor has detected the rotational position.

5. The fan motor control unit according to claim 1,
wherein the current sensor is provided between the power source and the switching unit.

6. The fan motor control unit according to claim 1,
wherein the current sensor detects a peak value of the current flowing in the fan motor.

7. A fan motor control unit comprising:
a rotational position detection sensor that detects a rotational position of the fan motor;
a switching unit that selectively connects each of coils of the fan motor to a power source;
a current sensor that detects a current flowing in the fan motor; and
a switching control unit that advances, in the case where the current detected by the current sensor exceeds a threshold, a energization timing from the power source to the coils with respect to the energization timing applied while the current detected by the current sensor is lower than the threshold, on the basis of the rotational position detected by the rotational position detection sensor;
wherein the switching control unit includes a threshold storage unit that stores therein one or more thresholds, and a stepless and continuous threshold is stored in the threshold storage unit.

8. The fan motor control unit according to claim 7,
wherein the current sensor is provided between the power source and the switching unit.

9. The fan motor control unit according to claim 7,
wherein the current sensor detects a peak value of the current flowing in the fan motor.

* * * * *